US012718646B2

(12) United States Patent
Birnie et al.

(10) Patent No.: US 12,718,646 B2
(45) Date of Patent: Aug. 25, 2026

(54) PRESSURIZED SECURITY ENCLOSURES FOR MEDIA TERMINALS

(71) Applicant: NCR Atleos Corporation, Atlanta, GA (US)

(72) Inventors: Steven James Birnie, Dundee (GB); Ian McFarlane Denny, Perth (GB)

(73) Assignee: NCR Atleos Corporation, Atlanta, GA (US)

( * ) Notice: Subject to any disclaimer, the term of this patent is extended or adjusted under 35 U.S.C. 154(b) by 497 days.

(21) Appl. No.: 18/128,426

(22) Filed: Mar. 30, 2023

(65) Prior Publication Data

US 2024/0331483 A1 Oct. 3, 2024

(51) Int. Cl.
*G07D 11/225* (2019.01)
*G08B 13/20* (2006.01)

(52) U.S. Cl.
CPC .......... *G07D 11/225* (2019.01); *G08B 13/20* (2013.01)

(58) Field of Classification Search
CPC .... G07D 11/22; G07D 11/225; G07D 11/125; G08B 13/20
See application file for complete search history.

(56) References Cited

U.S. PATENT DOCUMENTS

| | | | | |
|---|---|---|---|---|
| 7,850,076 B1 * | 12/2010 | Dorenbaum | G07D 11/40 | 235/379 |
| 8,047,142 B2 * | 11/2011 | Villiger | A45C 13/18 | 109/31 |

* cited by examiner

*Primary Examiner* — Erika J. Villaluna
(74) *Attorney, Agent, or Firm* — Schwegman Lundberg & Woessner, P.A.

(57) ABSTRACT

Air is pressurized in a pressurized security apparatus which surrounds a housing for a safe of a media recycler/dispenser or a housing for the media recycler/dispenser. Air pressure is monitored for the pressurized security apparatus. Air pressure that drops below a configured amount causes a security event to be sent to a security system as an indication that the safe and/or recycler/dispenser has been tampered with by unauthorized individuals. The security system initiates security actions that can include dispatching authorities to a location associated with the recycler/dispenser.

9 Claims, 9 Drawing Sheets

PRESSURIZED SECURITY ENCLOSURES FOR MEDIA TERMINALS

BACKGROUND

The principals of safe construction have not changed since the 16$^{th}$ century. The current industry standard way of securing cash is to surround the safe in a combination of steel plate and concrete. There are some variations this, using ½" thick steel plate with thicker layers of concrete and metal additives. Access doors are secured by a series of steel bolts.

There are issues with the current industry standards from both a sustainability and business perspective. Concrete uses a lot of water and energy as does steel. The paining process used to coat sages emits volatile organic compounds (VOCs) which are environmentally damaging. Shipping heavy safes around the world is costly and environmentally damaging. Due to the weight of the safe, the customer needs structure engineering analysis and safety certification for each site. This adds time and significant expense to any business that is setting up a media terminal with a safe.

Safes are purposefully designed so as to not be easy to deconstruct. This makes recycling or reuse of component parts very challenging. For each iteration of new safe designs, the industry does not reuse safes from previous generations as safes are not designed to be adaptable. Landfill costs are rising and are businesses are burdened by these costs.

SUMMARY

In various embodiments, a media recycler/dispenser, media recycler/dispenser pressurized apparatuses, and method for detecting a breach in pressurized apparatus of a media recycler/dispenser are presented. In an embodiment, a media recycler/dispenser is provided. The recycler/dispenser includes pressurized air that surrounds a housing of a safe associated with the recycler/dispenser or surrounds a housing of the recycler/dispenser. The pressurized air is monitored for a drop in air pressure below a threshold level. When air pressure is below the threshold, a security alert is sent to a security system to dispatch and undertake security measures at the recycler/dispenser.

DETAILED DESCRIPTION

Safe designs in the industry and focused on structural strength and increased difficulty for any would be intruder. Safes are common in media terminals, such as automated teller machines, self-service terminals, and/or point-of-sale terminals. Businesses the provided media terminals incur substantial labor and costs associated with obtaining, installing, and monitoring the terminals. Security of media terminals are of the upmost concern of the businesses since the terminals house currency in their safes.

A Media terminal includes a media peripheral device that interfaces to the terminal to permit currency-based transactions. The media peripheral device can be a recycler or a dispenser. For purposes of the discussions herein both the recycler and dispenser are also a media depositor, which is capable of accepting currency as a payment for a transaction or as a deposit into a financial account. The recycler/dispenser includes media cassettes into which the currency is deposited, recycled, and dispensed. In some cases, the cassettes are located within a safe of the recycler/dispenser.

The embodiments discussed herein and below provides a design for the recyclers/dispensers that include either an internal pressurized security apparatus that is integrated into the designs or that include an external portable pressurized security apparatus that is capable of securing the recycler/dispenser without altering an existing design of the recyclers/dispensers. Rather than focusing on strength of the materials, the pressurized security apparatuses focus on tampering detection for purposes of causing security systems and/or alarms to be activated when there is a breach into a recycler/dispenser. Air pressure is monitored in the pressurized apparatus to detect a breach into the safe of the recyclers/dispensers such that when the air pressure is below a configured level, a security system and/or alarm is raised.

The materials used in the pressurized security apparatuses are recyclable, environmentally friendly, and re-usable. Furthermore, by making detection of breaches more sensitive than what has previously been available, designs of safes for recyclers/dispensers can utilize lower cost and lighter weight materials, which can also be environmentally friendly.

Figure 1A:
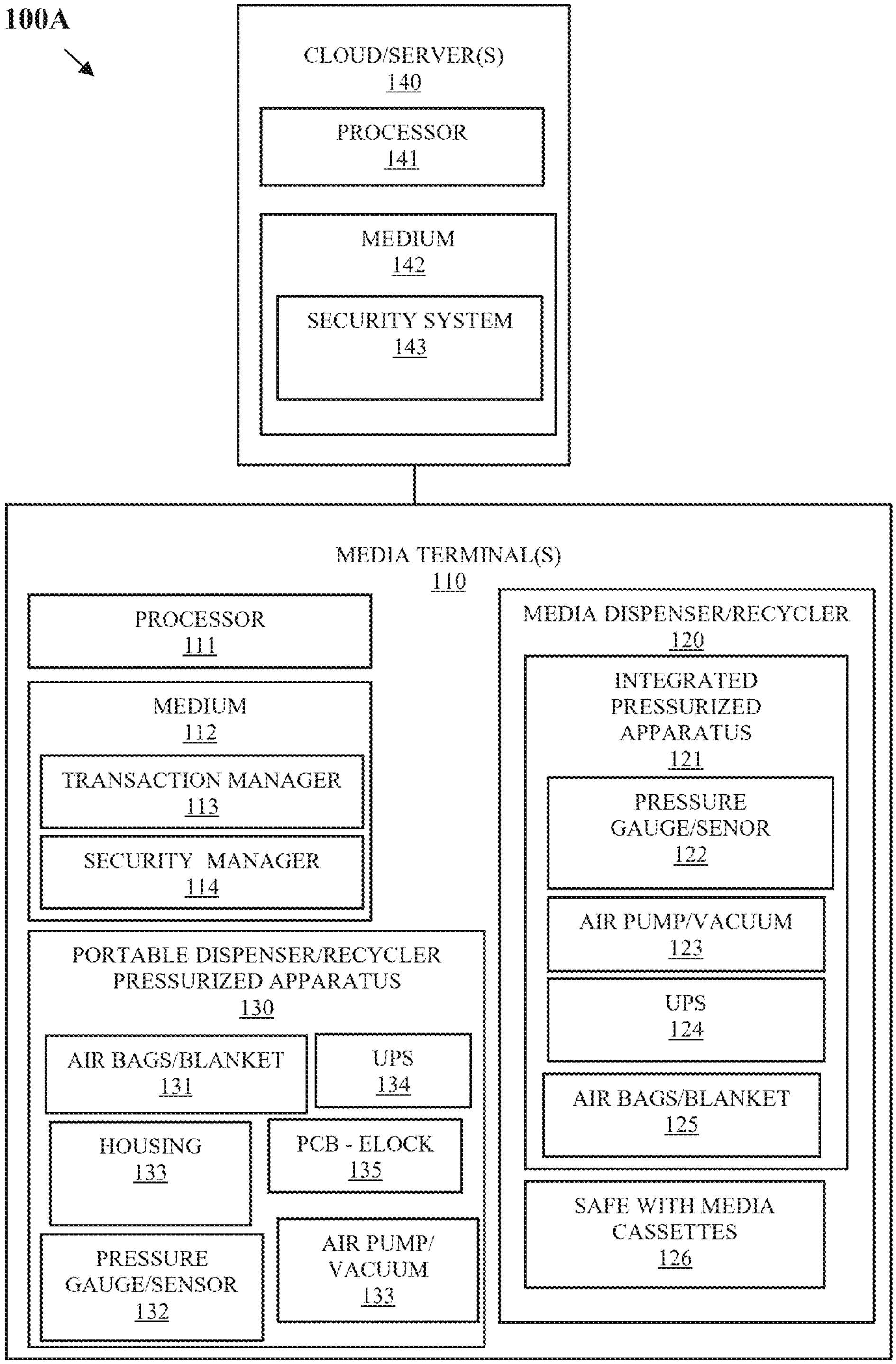
FIG. 1A is a diagram of a system including pressurized dispenser/recycler apparatuses for media terminals, according to an example embodiment.

FIG. 1A is a diagram of a system 100A for pressurized security apparatuses for media terminals. It is to be noted that the components are shown schematically in greatly simplified form, with only those components relevant to understanding of the embodiments being illustrated.

Furthermore, the various components (that are identified in FIG. 1A) are illustrated and the arrangement of the components is presented for purposes of illustration only. It is noted that other arrangements with more or less components are possible without departing from the teachings of pressurized security apparatuses for media terminals presented herein and below.

System 100A includes one or more media terminals (hereinafter "terminals") 110 and optionally a cloud 160 or a server 160 (hereinafter just "cloud 160'). Each terminal 110 includes a processor 111, a non-transitory computer-readable storage medium, which includes executable instructions for a transaction manager 113 and a security manager 114. Each terminal 110 includes a media dispenser/ recycler 120 and optionally a portable dispenser/recycler pressurized apparatus 130. Each media dispenser/recycler 120 also includes a safe with media cassettes 126. In an embodiment, the media dispenser/recycler 120 further includes an integrated pressurized apparatus 121, which includes a pressure gauge 122, an optional air pump/vacuum, an optional uninterrupted power supply (UPS) 124, and air bags/blankets 125.

In an embodiment, the media terminal 110 includes a portable dispenser/recycler pressurized apparatus 130. Apparatus 130 includes air bags/blanket 131, an optional housing 133, a pressure gauge 132, an optional UPS 134, an optional printed circuit board (PCB) with an e-lock and corresponding interface 134.

The pressurized apparatus 121 and/or 130 is configured and provided in a variety of different manners. For example and in an embodiment, an internal pressurized apparatus 121 includes air bags/blanket 125 sandwiched inside of a housing of the dispenser/recycler 120 and/or the housing surrounding the safe with media cassettes 126. In this embodiment, the housing of the dispenser/recycler 120 and/or the housing of the safe with media cassettes 126 of the dispenser/recycler 120 is manufactured to include the air bags/blanket 125 within the housing.

In another embodiment, the housing of the dispenser/recycler 120 and/or the housing of the safe with media cassettes of the dispenser/recycler is manufactured with an air tight and sealed gap. A port in the housing permits the internal cavity of the housing to be pressurized with air. In this instance, the housing itself with the features recited above is an internal pressurized apparatus of the dispenser/recycler 120.

In another embodiment, a portable pressurized apparatus 130 provides security to the dispenser/recycler 120 and/or the safe with media cassettes 126 of the dispenser/recycler 120. In an embodiment, a portable air bags/blanket 131 are draped and zipped around and the external housing of the dispenser/recycler 120 and/or safe with media cassettes 126 a port permits the bags/blanket 131 to be inflated and pressurized, another port or the same port permits a pressure gauge 122 to monitor the pressure. In an embodiment, a pressure gauge is included with a kit associated with the portable dispenser/recycler apparatus 130. In an embodiment, the media terminal 110 includes the pressure gauge.

In yet another embodiment, a portable apparatus 130 is packaged with a housing 113 or a shell that snaps around and outside of the housing associated with the dispenser/recycler 120 and/or safe with media cassettes 126. The portable apparatus is packaged with air bags/blanket 131. The air bag/blanket 131 is draped around the housing of the dispenser/recycler 120 and/or safe with media cassettes 126 and the housing 131 snaps around it. Points on the air bag/blanket 131 include glue patches to adhere to inside surfaces of housing 113. In this matter, if housing 113 is attempted to be separated and removed from the housing associated with the dispenser/recycler 120 and/or safe with media cassettes 126, the bag/blanket 131 ruptures and a drop in pressure is detected via a pressure gauge.

In an embodiment of the last referenced embodiment, the bags/blanket include a seam with a zipper for access to the safe with media cassettes 126 by authorized personnel. The seam is held in place by a magnet. Additionally, the bags/blanket 131 and/or housing 133 includes an access panel that is magnetized to hold in place or open and attached to a second and e-lock. An e-lock interface display is opened to gain access to the cassettes 126 via a properly authenticated a code is properly which allows the bags/blanket 131 to be unzippered and/or within allows access to the cassettes 126.

In an embodiment, the pressurized apparatus 121 and/or 130 includes an air retention apparatus. The air retention apparatus is the hollow cavity between exterior walls 126A and interior walls 126B of the housing for the safe 126 or dispenser/recycler 120, air bags or blanket 125 maintained in the hollow cavity of the housing, or air bags or blanket 131.

Figure 1B:
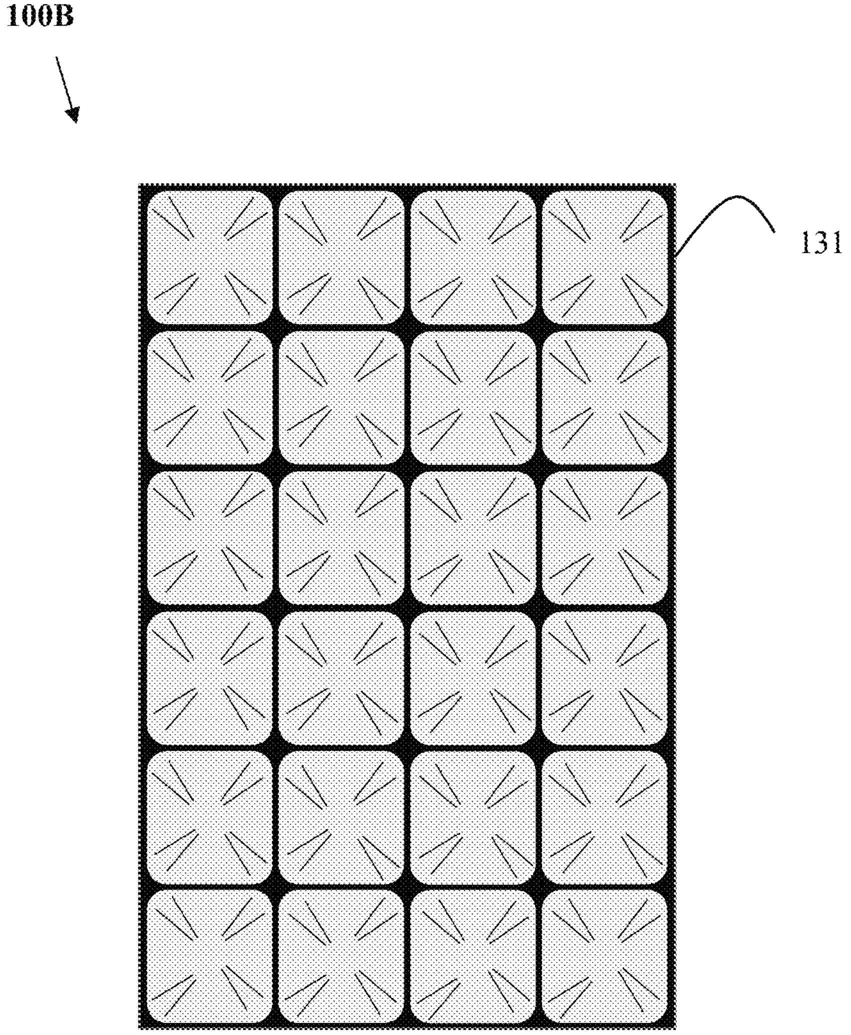
FIG. 1B is a diagram of a component of a pressurized dispenser/recycler apparatus for a media terminal, according to an example embodiment.

The above-discussed pressurized apparatuses 121 and/or 130 and other pressurized apparatuses 121 and 130 are now discussed with reference to FIGS. 1B-1H. FIG. 1B is a diagram 100B of an air blanket 125 and/or 131 of a pressurized dispenser/recycler apparatus 121 and/or 130 for a media terminal 120, according to an example embodiment. Blanket 131 includes a series of inflatable bags organized together as blanket 121 and/or 130. A port permits air to be pumped into the blanket 125 and/or 131 and the same port or a different port permits an air pressure gauge to be interfaced for purposes of initially setting air pressure and detecting loss of air pressure below the initial setting or below a threshold amount from the initial setting. The gauge 122 is interfaced to a sensor 122, which reports the air pressure within the blanket to security manager 114. Security manager 114 raises an event or an alert to security system 143 when the air pressure within the blanket 125 and/or 131 drops below a preconfigured amount. This is an indication that authorized access to the dispenser/recycler 120 and/or the safe 126 has occurred. Security system 143 can sound alarms and dispatch authorities to the location associated with media terminal 110.

Figure 1C:
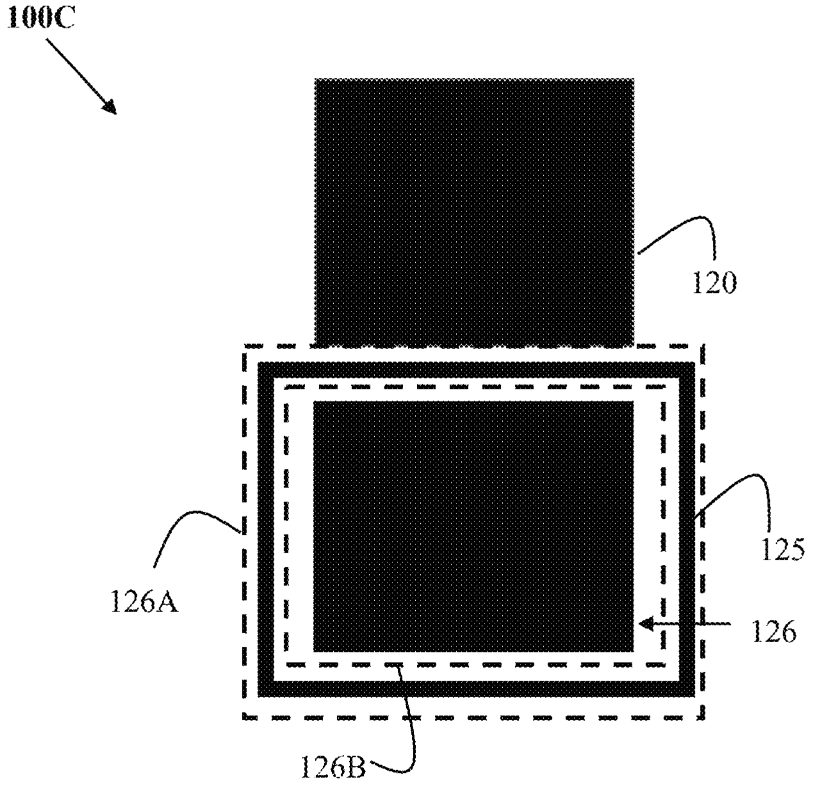
FIG. 1C is a diagram of a dispenser/recycler with an integrated pressurized apparatus for a media terminal, according to an example embodiment.

FIG. 1C is a diagram 100C of a dispenser/recycler 120 with an integrated pressurized apparatus 121 for a media terminal 110, according to an example embodiment. The housing for safe 126 includes a hollow cavity within which is an air bag/blanket 125. Bag/Blanket 125 surrounds the safe within the hollow cavity of the housing for safe 126. A port located on an exterior surface of the safe's housing or interior of the safe 126 permits the bag/blanket 125 to be inflated and the same port or a different port allows pressure gauge 122 to monitor the air pressure. When the air pressure is below a threshold security manager 114 raises an event or sends a notification to security system 143. The hollow cavity is defined by an exterior wall 126A and an interior wall 126B, inside the hollow cavity is bag/blanket 125.

Figure 1D:
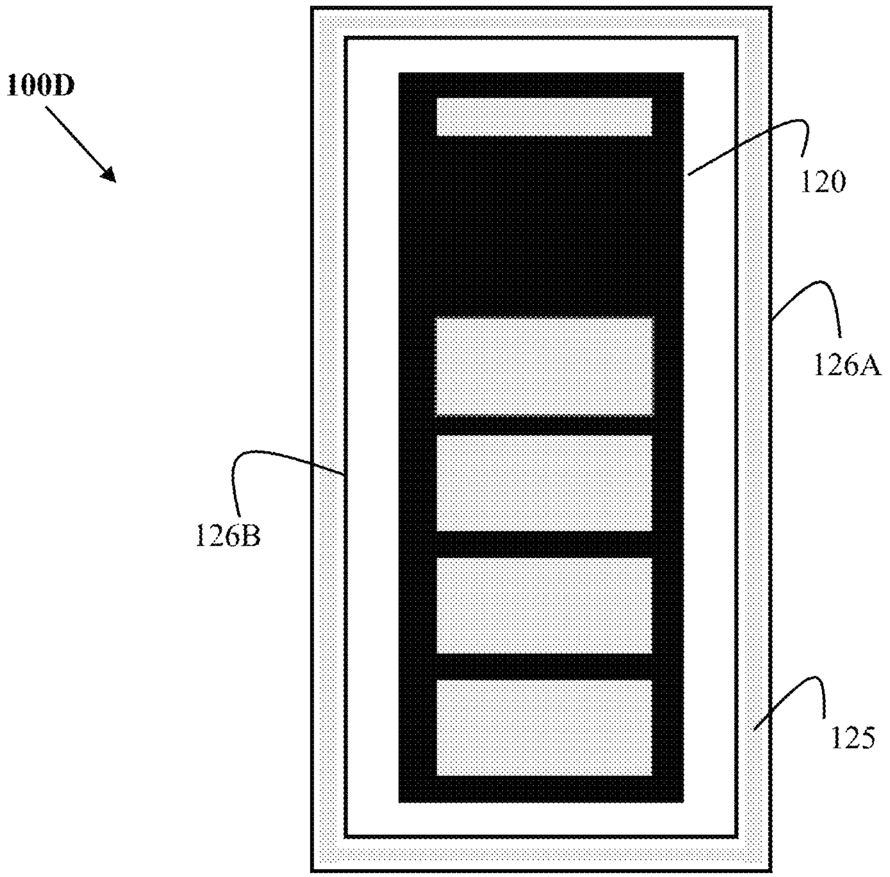
FIG. 1D is another diagram of a dispenser/recycler with an integrated pressurized apparatus for a media terminal.

FIG. 1D is another diagram 100D of a dispenser/recycler 120 with an integrated pressurized apparatus 121 for a media terminal 110. In this example, the housing for the entire dispenser/recycler 120 includes a hollow cavity defined by an exterior wall 126A and an interior wall 126B. Bag/Blanket 125 is inserted, inflated, and monitored for security breaches in the manners discussed above with FIG. 1C.

Figure 1E:
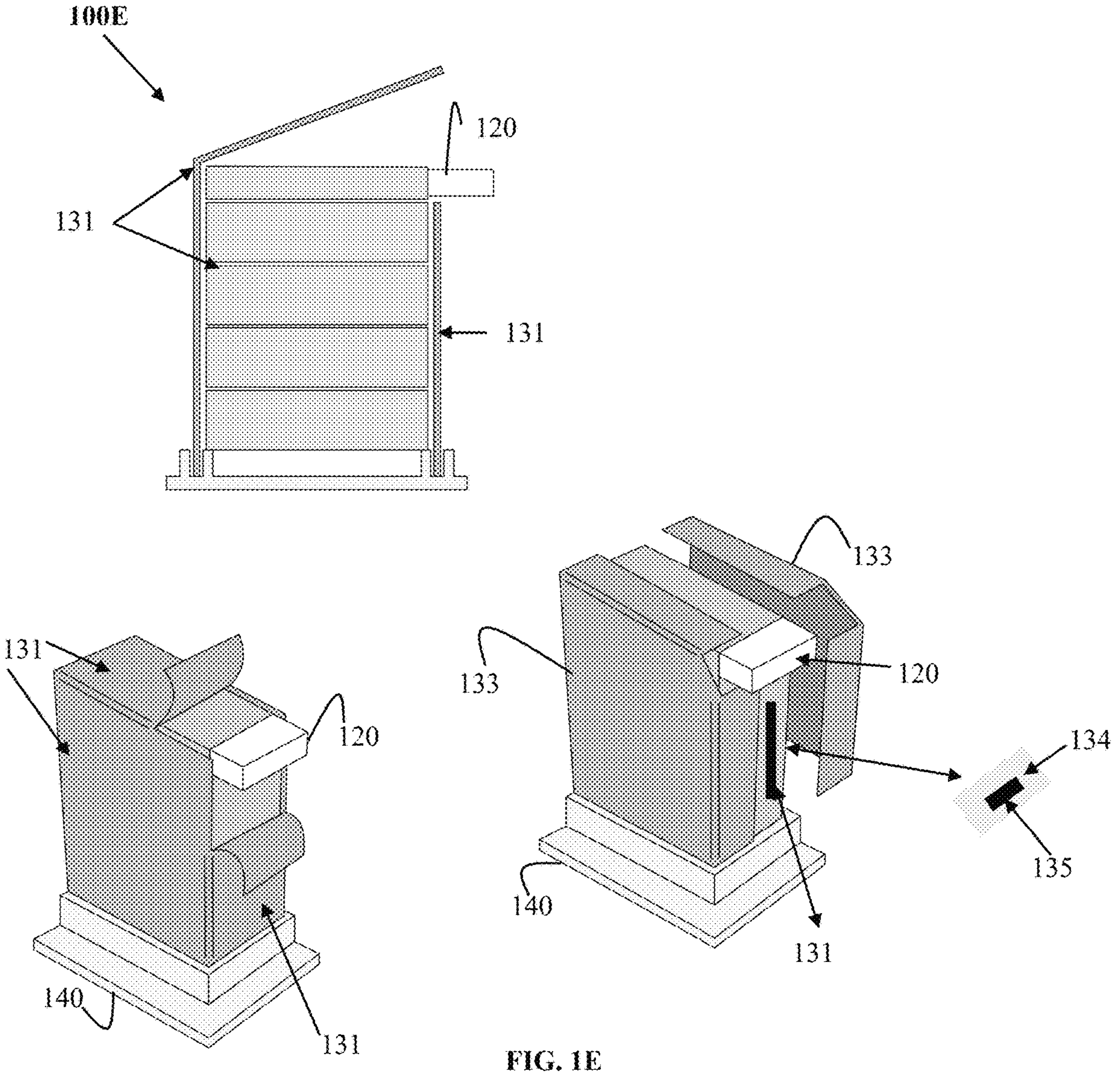
FIG. 1E is diagrams illustrating a portable pressurized apparatus for a media terminal, according to an example embodiment.

FIG. 1E is diagrams 100E illustrating a portable pressurized apparatus 130 for a media terminal 120, according to an example embodiment. The top illustration in FIG. 1E shows a bag/blanket 131 surrounding an outer housing of a dispenser/recycler 120. In this embodiment, there is no design change or modifications needed for the dispenser/recycler 120. The bottom left illustration in FIG. 1E shows the bag/blanket 131 completely surrounding the sides, front, and top of the housing of the dispenser/recycler 120.

In an embodiment, shown in the bottom right illustration, a magnetic strip keeps a seam of bag/blanket 131 (only a portion of air bags/air blanket is illustrated in FIG. 1E) in place and permits an e-lock display with interface 135 to provide access to cassettes 126 via access panel 134. A code is entered by service personnel to deactivate and remove the access panel 134 to gain authorized access to the cassettes 126. The e-lock may also be attached to a sensor 132 such that if it is removed without a code, security manager 114 raises an alert or a security event to security system 143. Additionally, the bottom right illustration shows the housing 133 that snaps around the bag/blanket 131 (again, only a portion of air bags/air blanket is illustrated in the rightmost figure of FIG. 1E) to seal the bag/blanket around the housing of the dispenser/recycler 120. In an embodiment, a magnetic door is included with the housing or shell 133 to allow entry to the bag's e-lock display and interface 135.

A plinth 140 is also shown in the bottom illustrations. A plinth is a post secured in the ground or to a floor surface that extends up within an interior of the safe 126 and the safe 126 is fastened to the plinth 140. Diagram 100E shows that the existing mechanisms used to secure the safe 126 can remain unchanged and the portable apparatus 130 is completely compatible with this security measure used with some safes 126, particularly outdoor media terminals 110.

In an embodiment, the housing 133 and/or bag/blanket 131 is shipped with the plinth 140. Bag/Blanket 131 is deflated and stored on the inside of the plinth during transit to the site of install. In this way, no additional space is required to transport the bag/blanket 131.

Figure 1F:
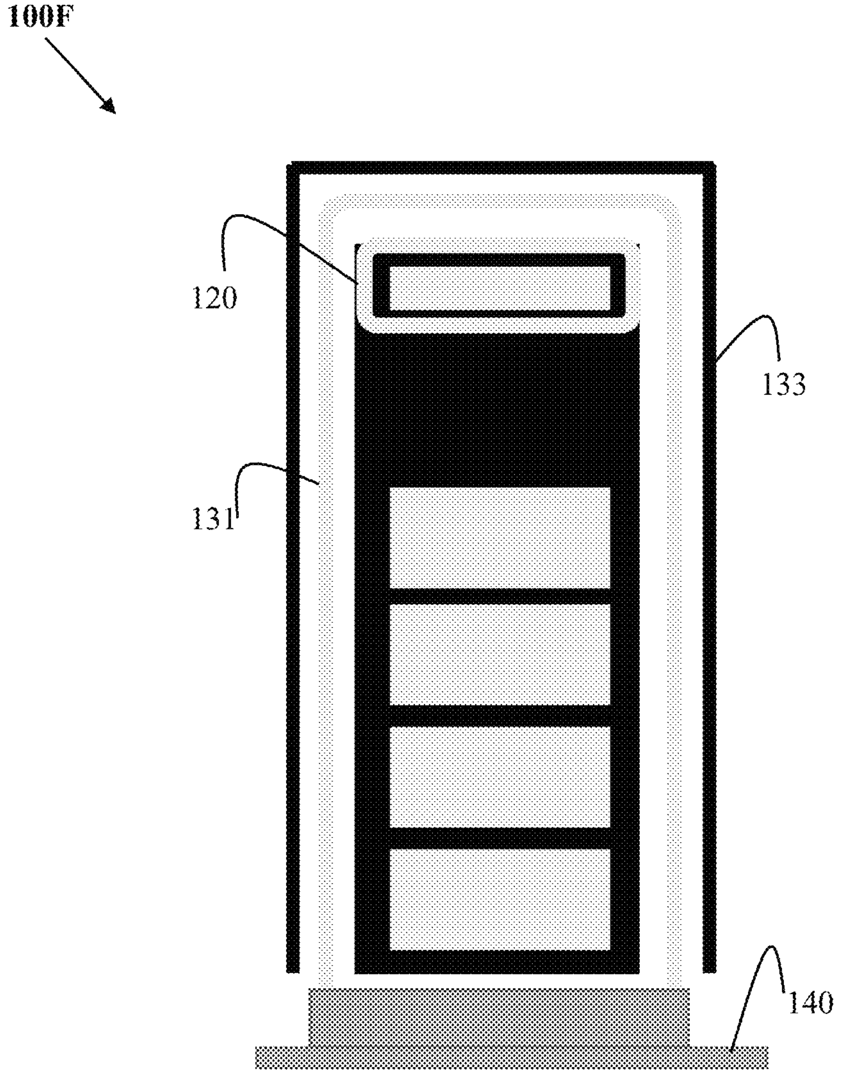
FIG. 1F is a diagram of another portable pressurized apparatus for a media terminal, according to an example embodiment.

FIG. 1F is a diagram 100F of another portable pressurized apparatus 130 for a media terminal 110, according to an example embodiment. A safe 123 and/or dispenser/recycler 110 is secured to a plinth 140 using conventional approaches as discussed above. Bags/Blanket 131 is zippered around the outer housing of the safe 126 and/or dispenser/recycler 120 and inflated to a desired level of air pressure. Housing or shell 133 is snapped around the exterior of the bags/blanket 131. Bags/Blanket 131 includes a port attached to an air pressure gauge and a sensor 132, when the security manager 114 detects a pressure drop below a configured threshold, security manager 114 raises an event or an alert to security system 143.

Figure 1G:
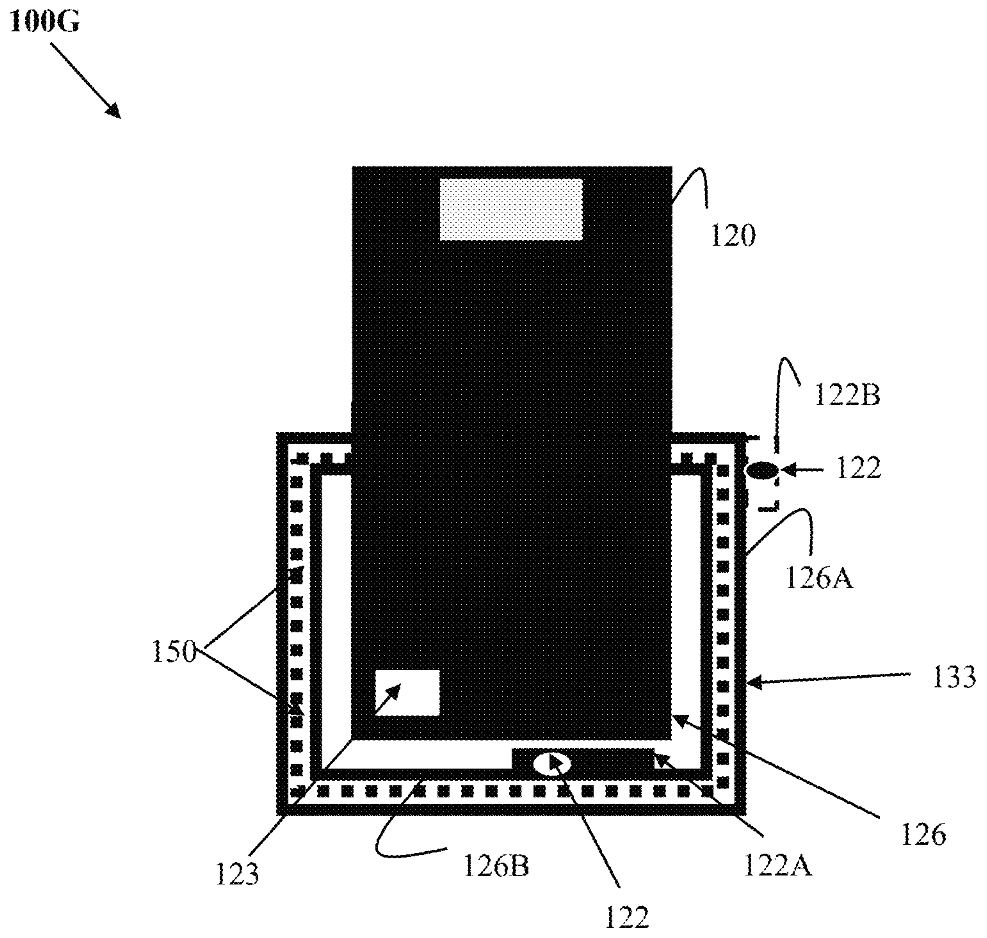
FIG. 1G is a diagram of an integrated portable pressurized apparatus for a media terminal, according to an example embodiment.

FIG. 1G is a diagram 100G of an integrated portable pressurized apparatus 121 for a media terminal 120, according to an example embodiment. In this embodiment, a housing for safe 126 is manufactured with an air tight hollow gap defined by an exterior wall 126A and an interior wall 126B. the housing includes a port 122A from which air 150 can be inserted to pressurize the hollow gap of the housing. In an embodiment, the port 122A is located on an inside surface of the interior wall 126B, includes a pressure gauge 122 to monitor and report air pressures inside the hollow gap to the security manager 114. In an embodiment, the interior of the safe 126 further includes an air pump/vacuum 123 to automatically pressurize the hollow gap after the safe 126 is installed via a connection to the port 122A. In an embodiment, an exterior surface of the exterior wall 126A includes a port 122A for pressurizing the hollow gap after the safe 126 is installed. In an embodiment, both the exterior wall 126A and the interior wall 126B include the ports 122A for pressurizing air into the hollow gap of the housing for the safe 126.

Figure 1H:
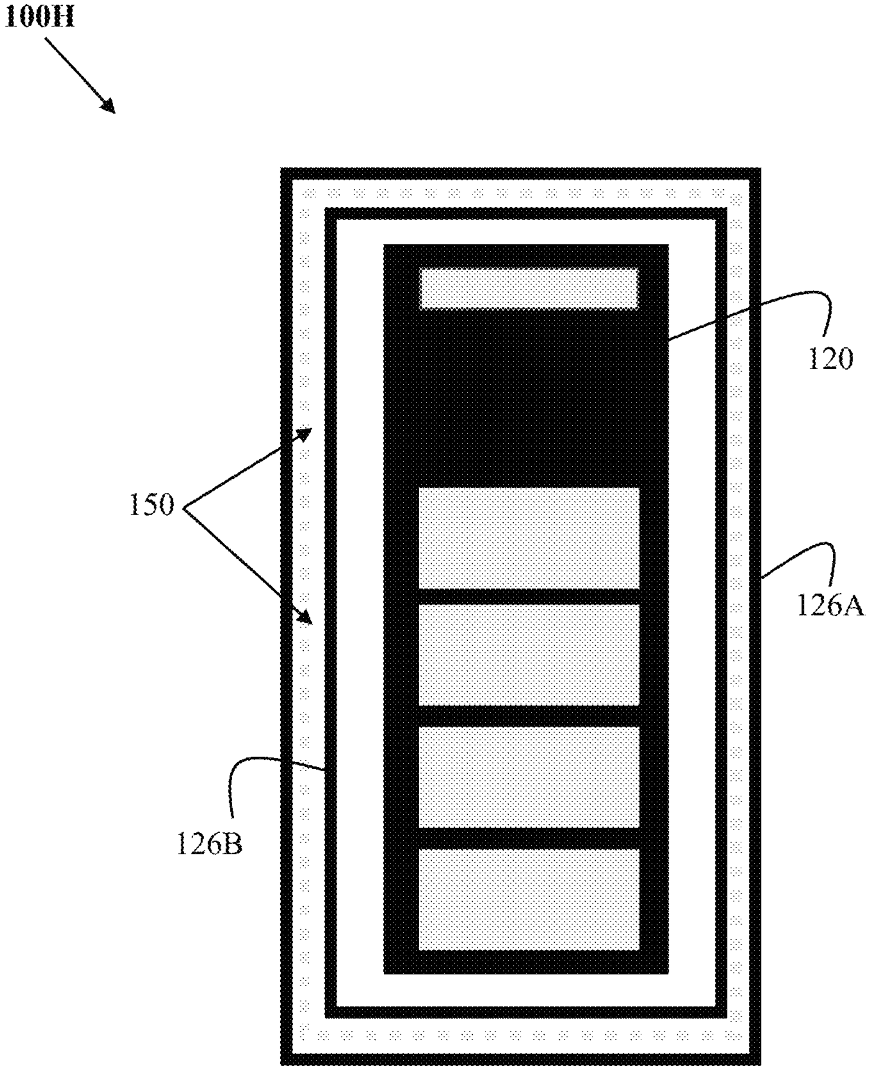
FIG. 1H is another diagram of an integrated portable pressurized apparatus for a media terminal, according to an example embodiment.

FIG. 1H is another diagram 100H of an integrated portable pressurized apparatus 121 for a media terminal 120, according to an example embodiment. Diagram 100H shows the entire housing of the dispenser/recycler 120 includes the air tight hollow gap between the housing's exterior wall 126A and interior wall 126B. The embodiments of the integrated portable pressurized apparatus 121 discussed in FIG. 1G are the same for the integrated portable pressurized apparatus 121 shown in FIG. 1H.

Figure 2:
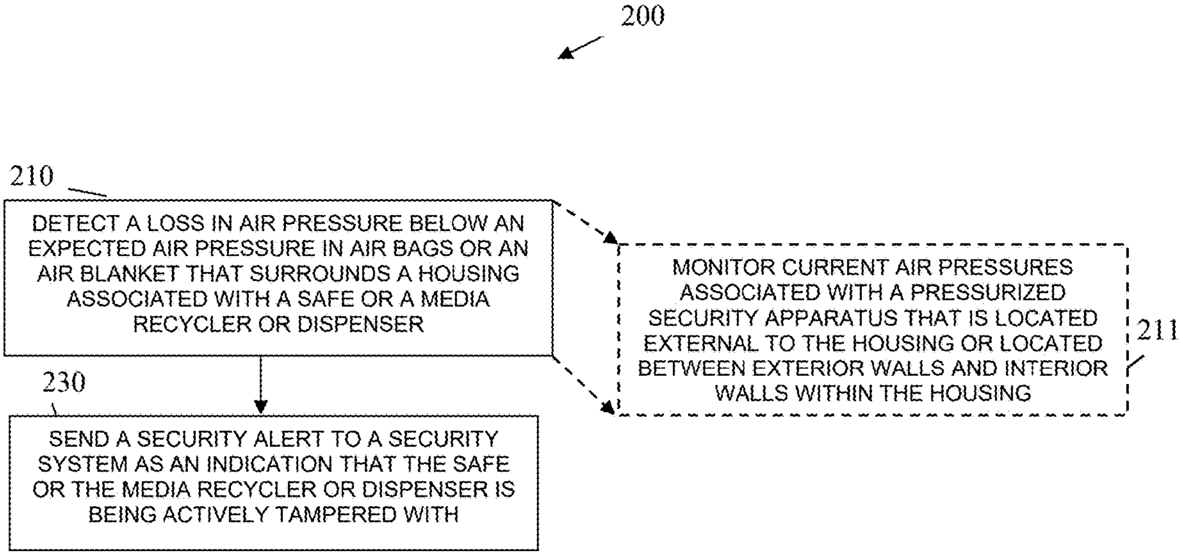
FIG. 2 is a flow diagram of a method for detecting a security breach in a pressurized apparatus of a dispenser/recycler, according to an example embodiment.

The above-referenced embodiments and other embodiments will now be discussed with reference to FIG. 2. FIGS. is a flow diagram of a method 200 for detecting a security breach in a pressurized apparatus of a dispenser/recycler, according to an example embodiment. The software module (s) that implements the method 200 is referred to as a "media terminal security manager." The media terminal security manager is implemented as executable instructions programmed and residing within memory and/or a non-transitory computer-readable (processor-readable) storage medium and executed by one or more processors of one or more devices. The processor(s) of the device(s) that executes the media terminal security manager are specifically configured and programmed to process media terminal security manager. The media terminal security manager has access to one or more network connections during its processing. The connections can be wired, wireless, or a combination thereof.

In an embodiment, the device that executes the media terminal security manager is media terminal 110. In an embodiment, terminal 110 is an ATM, an SST, or a POS terminal. In an embodiment, the media terminal security manager is executed on a combination of different devices 110 and/or 120. In an embodiment, the media terminal security manager is 114.

At 210, the media terminal security manager detects a loss in air pressure below an expected air pressure in air bags or an air blanket. The air bags or air blanket surrounds a housing associated with a safe or a media recycler or dispenser of a media terminal.

In an embodiment, at 211, the media terminal security manager monitors current air pressures associated with a pressurized security apparatus. The pressurized security apparatus is located external to the housing or located between exterior walls and interior walls within the housing.

At 220, the media terminal security manager sends a security alert to a security system. This is an indication that the safe or the media recycler or dispenser is being actively tampered with. The security system can activate security measures and/or dispense authorities to a location associated with the media terminal in response to the security alert.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A media recycler or dispenser, comprising:

a pressurized security apparatus;

a pressure gauge to obtain air pressures from pressurized air held by the pressurized security apparatus and;

a sensor coupled to the pressure gauge and to determine when a given air pressure is below a first air pressure by a configured amount;

wherein the pressurized security apparatus comprises:

the pressurized air maintained at the first air pressure within air bags or an air blanket inserted into a hollow cavity located between an exterior wall and an interior wall of a housing for a safe or a housing for the media recycler or the dispenser, the air bags or air blanket forming a sealed pressurized enclosure within the hollow cavity from which a drop in air pressure below the first air pressure is detectable by the pressure gauge via a port connecting the pressure gauge to the air bags or air blanket;

wherein the media recycler or dispenser is capable of accepting currency as a payment for a transaction or as a deposit into a financial account.

2. The media recycler or dispenser of claim 1 further comprising:

an air pump located in an interior of the safe.

3. The media recycler or dispenser of claim 2 further comprising:

an uninterrupted power supply (UPS) coupled to the sensor and the air pump.

4. The media recycler or dispenser of claim 1, wherein an interior of the safe includes an air port to establish the first air pressure for the pressurized air within the pressurized security apparatus.

5. The media recycler or dispenser of claim 1, wherein an exterior of the housing for the safe or the media recycler or dispenser includes an air port to establish the first air pressure for the pressurized air within the pressurized security apparatus.

6. The media recycler or dispenser of claim 1, wherein an exterior of the housing for the safe or the housing of the media recycler or the housing of the dispenser includes a first air port to establishing the first air pressure for the pressurized air within the pressurized security apparatus and wherein an interior for the housing of the safe includes a second air port to establish the first air pressure for the pressurized air within the pressurized security apparatus.

7. The media recycler or dispenser of claim 1, wherein the media recycler or dispenser is a peripheral device of an automated teller machine, a self-service terminal, or a point-of-sale terminal.

8. A pressurized security apparatus, comprising:

an air retention apparatus comprising air bags or an air blanket inserted into a hollow cavity located between an exterior wall and an interior wall of a housing of a safe or a media recycler or dispenser, the air bags or air blanket forming a sealed pressurized enclosure within the hollow cavity; and an air port to pressurize air within the air retention apparatus; a pressure gauge connected to the air port to monitor air pressure within the sealed pressurized enclosure of the air retention apparatus;

wherein the air retention apparatus surrounds an interior of the housing of the safe or the media recycler or dispenser; wherein air pressure within the air retention apparatus is monitored to indicate whether a breach was attempted on the housing of the safe or the media recycler or the dispenser; wherein the media recycler or dispenser is capable of accepting currency as payment for a transaction or as a deposit into a financial account.

9. A method, comprising:

detecting, via a pressure gauge connected to a port of air bags or an air blanket that are inserted into a hollow cavity located between an exterior wall and an interior wall of a housing associated with a safe or a media recycler or dispenser, the air bags or air blanket forming a sealed pressurized enclosure within the hollow cavity, a loss in air pressure below an expected air pressure within the sealed pressurized enclosure of the air bags or the air blanket inserted into the hollow cavity; and sending a security alert to a security system as an indication that the safe or the media recycler or dispenser is being actively tampered with responsive to the loss in air pressure being below the expected air pressure in the air bags or the air blanket.

* * * * *